United States Patent
Ackroyd

(10) Patent No.: US 7,269,851 B2
(45) Date of Patent: Sep. 11, 2007

(54) MANAGING MALWARE PROTECTION UPON A COMPUTER NETWORK

(75) Inventor: Robert John Ackroyd, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 724 days.

(21) Appl. No.: 10/036,521

(22) Filed: Jan. 7, 2002

(65) Prior Publication Data

US 2003/0131256 A1    Jul. 10, 2003

(51) Int. Cl.
*G08B 23/00* (2006.01)
(52) U.S. Cl. .................... 726/24; 726/22; 726/23; 726/25; 713/188
(58) Field of Classification Search ............... 713/201; 726/24, 22, 23, 25
See application file for complete search history.

(56) References Cited

U.S. PATENT DOCUMENTS

| | | | | |
|---|---|---|---|---|
| 4,788,637 | A * | 11/1988 | Tamaru ..................... 709/221 |
| 5,832,208 | A * | 11/1998 | Chen et al. .................. 726/24 |
| 5,842,002 | A * | 11/1998 | Schnurer et al. ............. 703/21 |
| 6,301,668 | B1 * | 10/2001 | Gleichauf et al. ............ 726/25 |
| 6,499,107 | B1 * | 12/2002 | Gleichauf et al. ............ 726/23 |
| 6,928,549 | B2 * | 8/2005 | Brock et al. ................ 713/194 |
| 7,017,185 | B1 * | 3/2006 | Wiley et al. ................. 726/23 |
| 7,036,148 | B2 * | 4/2006 | Brook et al. ................. 726/25 |
| 7,039,953 | B2 * | 5/2006 | Black et al. ................. 726/14 |
| 7,043,759 | B2 * | 5/2006 | Kaashoek et al. ............ 726/25 |
| 2002/0116639 | A1 * | 8/2002 | Chefalas et al. ............ 713/201 |
| 2002/0138760 | A1 * | 9/2002 | Naitoh ....................... 713/201 |
| 2002/0169982 | A1 * | 11/2002 | Brock et al. ................ 713/201 |
| 2003/0009693 | A1 * | 1/2003 | Brock et al. ................ 713/201 |
| 2003/0023866 | A1 * | 1/2003 | Hinchliffe et al. .......... 713/200 |
| 2003/0055963 | A1 * | 3/2003 | Butt et al. ................... 709/225 |
| 2003/0084322 | A1 * | 5/2003 | Schertz et al. .............. 713/200 |
| 2003/0110395 | A1 * | 6/2003 | Presotto et al. ............. 713/201 |
| 2003/0177397 | A1 * | 9/2003 | Samman ..................... 713/201 |
| 2003/0191957 | A1 * | 10/2003 | Hypponen et al. .......... 713/200 |
| 2004/0088570 | A1 * | 5/2004 | Roberts et al. ............. 713/201 |
| 2004/0230840 | A1 * | 11/2004 | Radatti ....................... 713/201 |

* cited by examiner

*Primary Examiner*—Nasser Moazzami
*Assistant Examiner*—Eleni A. Shiferaw
(74) *Attorney, Agent, or Firm*—Zilka-Kotab, PC; Christopher J. Hamaty

(57) ABSTRACT

A managing computer within a computer network serves to log messages received from individual computers within that computer network indicating detection of malware. The managing computer detects patterns of malware detection across the network as a whole a triggers associated predetermined anti-malware actions. These may include forcing specific computers to update their malware definition data, forcing particular computers to change their security settings and isolating individual portions of the computer network.

29 Claims, 7 Drawing Sheets

MANAGING MALWARE PROTECTION UPON A COMPUTER NETWORK

BACKGROUND OF THE INVENTION

1. Field of the Invention

This invention relates to the field of data processing systems. More particularly, this invention relates to the field of malware protection, such as, for example, protection against computer viruses, worms, Trojans, banned files, banned words, banned images etc, upon a network of connected computers.

2. Description of the Prior Art

It is known to provide malware protection mechanisms for individual computers. Such malware protection mechanisms include on-access and on-demand malware scanners operating on client computers, mail gateway scanners, web traffic scanners and the like. These malware protection mechanisms are generally effective at detecting items of malware at their point location.

As computer networks have become more widespread and complex, and the threats posed by newly developed types of malware more sophisticated and potentially damaging, it is important that malware protection is systematically and thoroughly implemented on a computer network. In many ways, the malware protection of a network is only as good as the weakest link in that protection. In order to assist with this, it is known to provide products, such as ePolicy Orchestrator produced by Network Associates, Inc, that serve among other things to manage across a computer network the security and malware protection settings used by the various computers constituting that computer network.

Given the threat posed by malware, such as the well known damaging effects of mass-mailing computer viruses, measures that can improve the effectiveness with which such threats can be dealt with are strongly advantageous.

SUMMARY OF THE INVENTION

Viewed from one aspect of the present invention provides a computer program a computer program product for controlling a managing computer to manage malware protection within a computer network containing a plurality of network connected computers, said computer program product comprising:

receiving code operable to receive at said managing computer a plurality of log data messages identifying detection of malware by respective ones of said plurality of network connected computers;

detecting code operable to detect from said plurality of log data messages received by said managing computer a pattern of malware detection across said plurality of network connected computers matching one or more predetermined trigger patterns; and action performing code operable in response to detection of one or more predetermined trigger patterns to perform one or more predetermined anti-malware actions.

The invention recognises that by collecting together within a managing computer notifications of malware detections occurring within different computers on a computer network, predetermined patterns of malware detection can be identified and appropriate anti-malware measures triggered. As an example, a prior art simplistic approach that might have been taken by a Network Administrator when they received a large number of user reports of computer viruses being detected, would be to download the latest virus definition data from the malware scanner provider's FTP site and then force a network-wide update of all the virus scanners on all the computers of the network to the latest virus definition data. In practice, the amount of network traffic that this would generate during normal operating hours could be sufficient to cripple the operation of the computer network to a degree that is almost as bad as the action of the computer virus itself. Contrasted with this, the managing computer of the present invention may detect malware detection occurring within computers on the network already having the up-to-date virus definition data. These computers may be properly dealing with the malware themselves by disinfecting, repairing or deleting the infected files or e-mails as appropriate. Typically, the majority of the computers on a computer network will be running the up-to-date virus definition data and these computers will not really be at risk from the computer virus concerned. What the managing computer may identify as a pattern is that whilst the computers having the up-to-date virus definition date are detecting the virus, no detection reports are being received from those computers that are not running the up-to-date virus definition data. An appropriate action in this circumstance would be to force a virus definition update only for those computers not having the up-to-date virus definition data being used by the other computers as it may well be that the reason these out-of-date computers are not reporting the virus detection is that their virus definition data does not include the appropriate fingerprint. This action would provide a good measure of protection and yet would typically generate much less computer network traffic to adversely influence network performance. The above scenario is only one example of how identifying a pattern of malware detections across a computer network may be used to trigger predetermined anti-malware actions tailored and targeted to particular threats and circumstances.

In preferred embodiments of the invention the network connected computers will typically run their own malware scanners and these malware scanners will preferably use malware definition data to identify the items of malware to be detected.

In this circumstance, a particularly preferred anti-malware action that may be triggered is to force an update of malware definition data being used. This can be targeted at those computers needing the update concerned.

Further preferred anti-malware actions may include adjusting the scanner settings of one or more of the malware scanners to perform more thorough scanning (e.g. turning on scanning of all file types, heuristic scanning, internet traffic scanning etc., where the normal settings are to conduct less thorough scanning in an effort to preserve processing resources on the client computers), and possibly isolating one or more portions of the computer network from the rest of the computer network in order to isolate a malware outbreak which has been detected as being localised within that network portion.

In preferred embodiments of the invention the managing computer stores the logged data messages within a database. Such an arrangement allows convenient querying of the database, such as automatic running of predetermined queries, in order to detect particular patterns within the logged data messages and then trigger appropriate responses.

The database may also advantageously store other information concerning the computers within the computer network relating to their malware protection, such as the malware scanner products being used, the versions of the scanner engines and malware definition data being used, the security settings in force on the computer and the like. This data may be highly useful in identifying patterns within the malware detection reports generated across the computer network to identify weaknesses and vulnerabilities that can be addressed by predetermined anti-malware actions.

Viewed from other aspects the present invention also provides a method for managing malware protection on a computer network and an apparatus for managing malware protection on a computer network.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
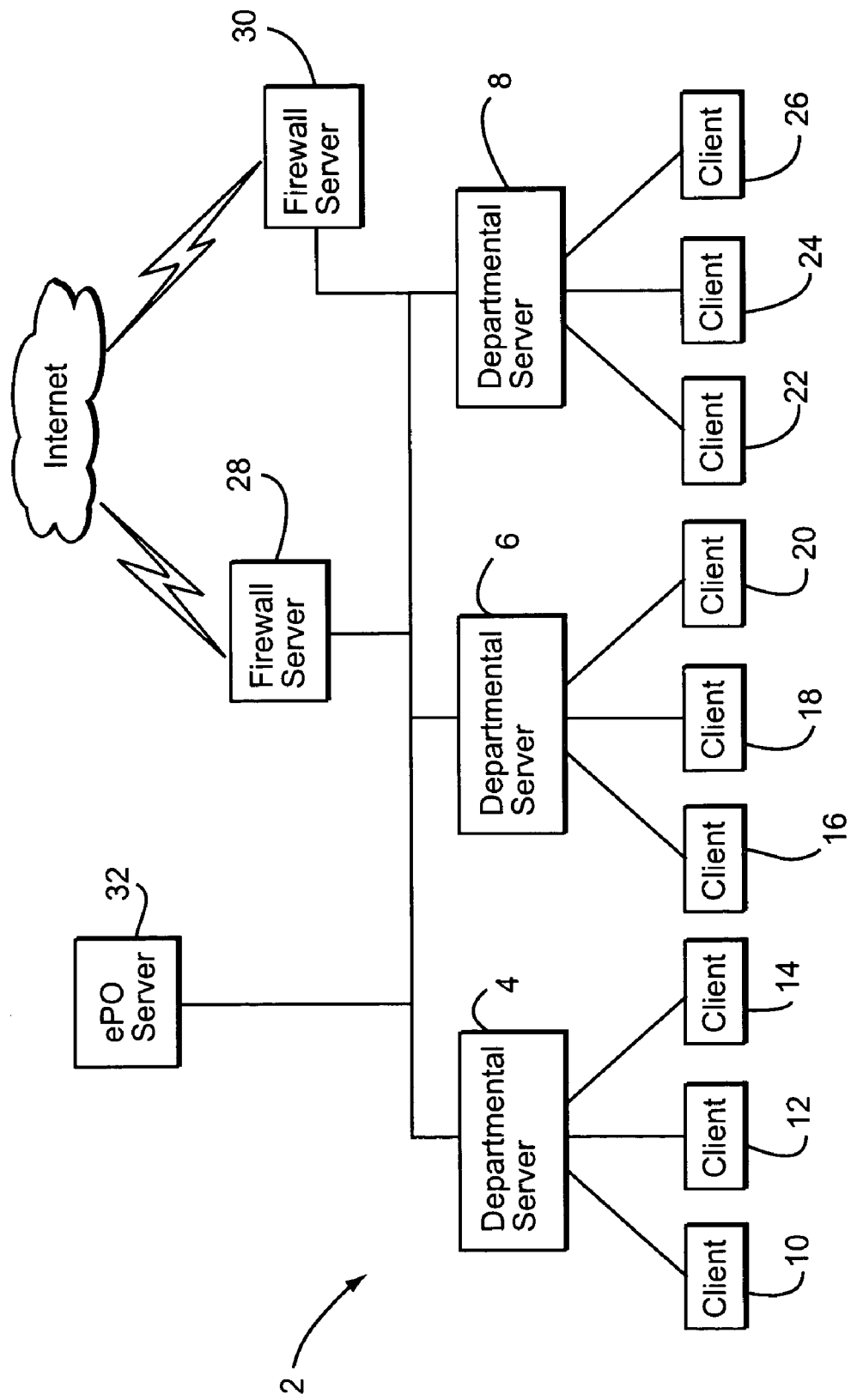
FIG. 1 schematically illustrates a computer network.

FIG. 1 illustrates a computer network 2 comprising three departmental servers 4, 6, 8 each with an associated number of client computers 10, 12, 14, 16, 18, 20, 22, 24 and 26. The two departmental servers 4 and 6 receive their internet traffic via a firewall server 28. The departmental server 8 has its own firewall server 30 via which it receives its internet traffic.

A malware policy organising server 32 (which may be running a program such as the previously mentioned ePolicy Orchestrator) is also connected in the computer network 2 and serves to monitor and enforce security settings on all of the computers within the computer network 2. The policy organising server 32 also serves to receive logged data messages from the various different servers and client computers within the computer network 2 indicating detection of malware items by the malware scanners operating at those individual computers. The policy organising server 32 also receives status information from the various computers indicating the malware scanning products being used, the scanner engine versions and virus definition data versions being used and the security settings being applied within those different computers on the network. The policy organising server 32 can enforce changes and trigger updates.

Figure 2:
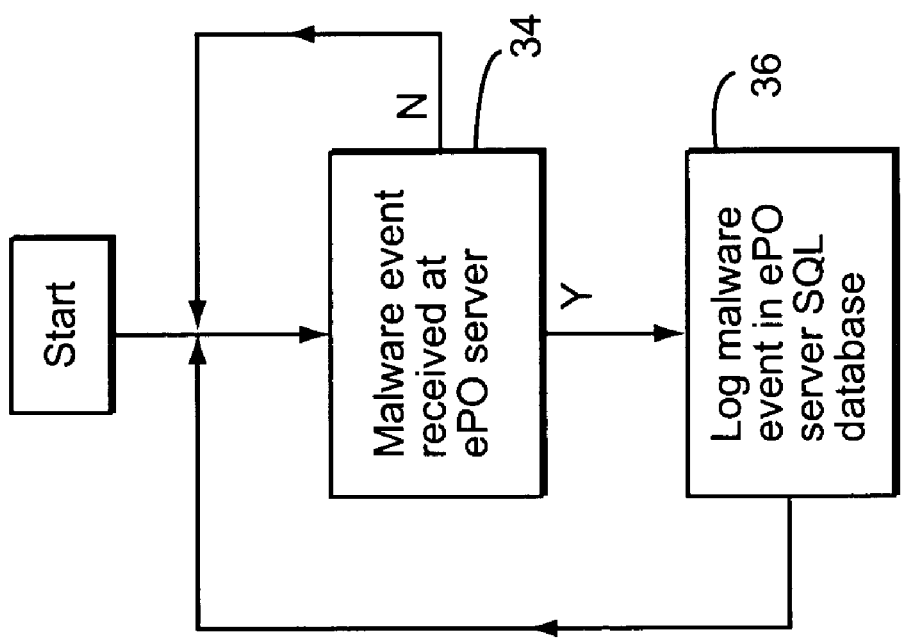
FIG. 2 is a flow diagram schematically illustrating the logging of malware events by a managing computer.

FIG. 2 illustrates the action of the policy organising server 32 in receiving logged data messages. At step 34 the policy organising server 32 waits to receive a malware detection event message from one of the various computers it is managing. When such an event is received, processing proceeds to step 36 at which it is logged within an SQL database maintained by the policy organising server 32. Processing then returns to step 36.

Figure 3:
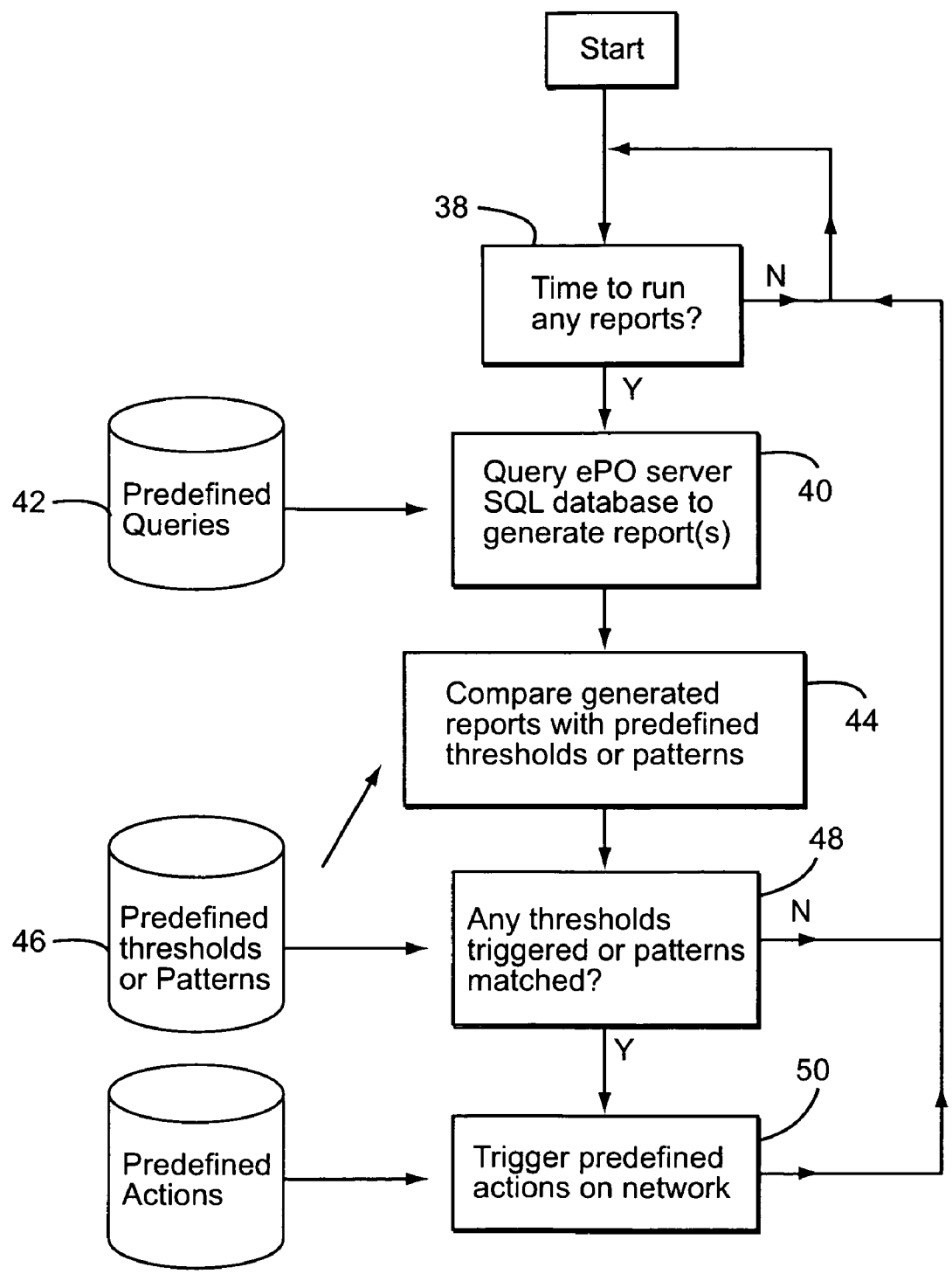
FIG. 3 is a flow diagram schematically illustrating the identification of trigger events across a computer network resulting in predefined anti-malware actions.

FIG. 3 is a flow diagram illustrating another processing thread performed by the policy organising server 32. At step 38 the system waits for predetermined regular times to occur at which it is configured to run various queries/reports (these terms are used generically to indicate mechanisms for retrieving specified data from a database and presenting it to a user rather than implying the use of any particular software or display/data format) upon the database it is maintaining to identify patterns of malware detection. When the time to run one or more such reports is identified at step 38, processing proceeds to step 40 at which the policy organising server 32 issues appropriate queries from a store of queries 42 to the database in order to generate the predetermined reports. The policy organising server 32 may be provided with a suite of default reports that may be used and these default reports may be configured and enhanced by individual users to tailor them to their particular networks, (e.g. scaling them to match the size of the network concerned: five malware detections on a network of 10,000 computers may be insignificant whereas the same number of malware detections on a network of 50 computers may be highly significant).

At step 44 the generated reports are compared with predetermined patterns and network-wide thresholds held in a store 46. These predefined network-wide thresholds and patterns may be provided in default form as templates and may optionally be customised to the particular circumstances of the network being protected.

At step 48 a determination is made as to whether or not any of the thresholds has been exceeded or any of the patterns matched. If no thresholds have been exceeded or patterns matched, then processing returns to step 38. If thresholds have been exceeded or patterns matched, then processing proceeds to step 50 at which one or more predefined anti-malware actions are triggered on the network. The anti-malware actions triggered will be selected in dependence upon the particular threshold or pattern that has been exceeded or matched and will be directed to the appropriate problem area within the network concerned. After the anti-malware actions, such as forcing virus definition data updates, changing malware scanner settings, isolating portions of the network etc. have been completed, processing returns to step 38.

Figure 4:
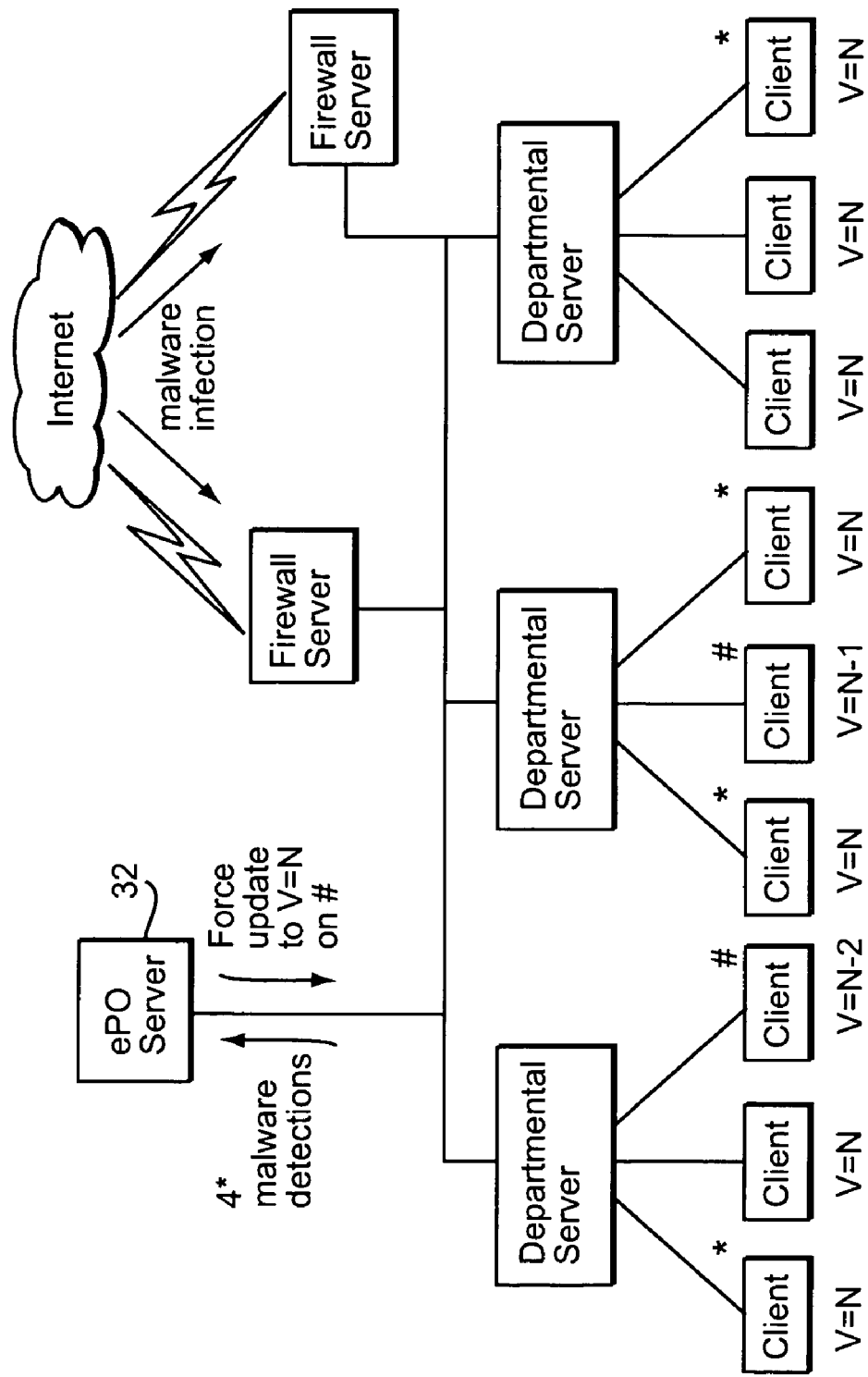
FIGS. 4, 5 and 6 schematically illustrate different examples of patterns of malware detections and associated predetermined anti-malware actions that may be triggered.

FIG. 4 schematically illustrates a pattern of malware detections and an associated anti-malware action. First of all a malware infection is received into the network from the internet. This starts to spread within the computer network. Those computers running the most up-to-date version of the virus definition data (indicated by V=N) detect this malware infection and take appropriate anti-malware action themselves as well as issuing a log data message back to the policy organising server 32. The computers within the network running out-of-date malware definition data (indicated by V=N−1 or V=N−2) do not detect the malware infection and do not give rise to any logged data messages sent back to the policy organising server. When the policy organising server 32 has detected four logged data messages corresponding to the particular item of malware and also detects the pattern that none of these originate from a computer running out-of-date malware definition data, the policy organising server 32 recognises the exceeding of a predetermined threshold in combination with a predetermined pattern of infection and serves to force the anti-malware action of updating the malware definition data on those computers that are out-of-date.

Figure 5:
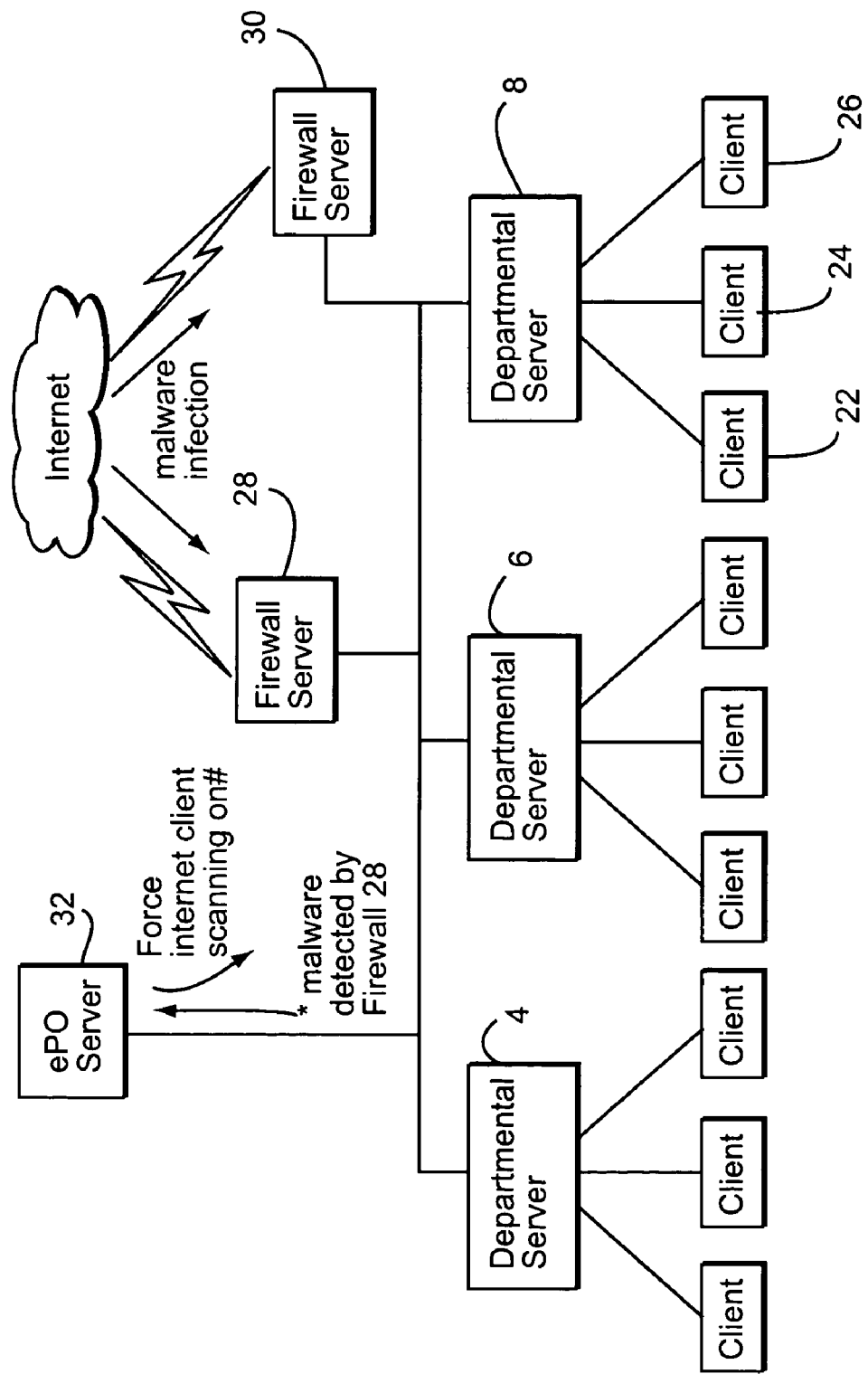

FIG. 5 schematically illustrates another scenario. In this example a malware infection again originates from the internet. The firewall server 28 serves to scan the traffic passing to two departmental servers 4 and 6 and their associated client computers. This firewall server 28 detects a series of occurrences of internet traffic infected with a particular item of malware and separately reports each of these to the policy organising server. A second firewall server 30 protecting a different associated departmental server 8 and its associated client computers is running a different type of malware scanner possibly provided by a different software manufacturer. No malware detection events are recorded by the policy organising server 32 from this firewall server 30. The pattern of events of in excess of a predetermined number of malware detections by the firewall server 28 with no events detected by the firewall server 30 running a different malware scanner indicates that this different malware scanner for some reason is not identifying the malware threat concerned. An appropriate anti-malware action in this circumstance is to switch on the internet traffic scanning operations on the location individual malware scanners of the client computers 22, 24 and 26. These malware scanners run at the client computer level are from the same software manufacturer as that providing the scanner on the firewall computer 28 and so have a good chance of picking up the malware infection that is being missed by their own firewall server 30. This is another example of a pattern of detections within a computer network being identified and triggering an appropriate action in a way that is simply not possible with the malware scanner products that operate and protect computers as individual entities.

Figure 6:
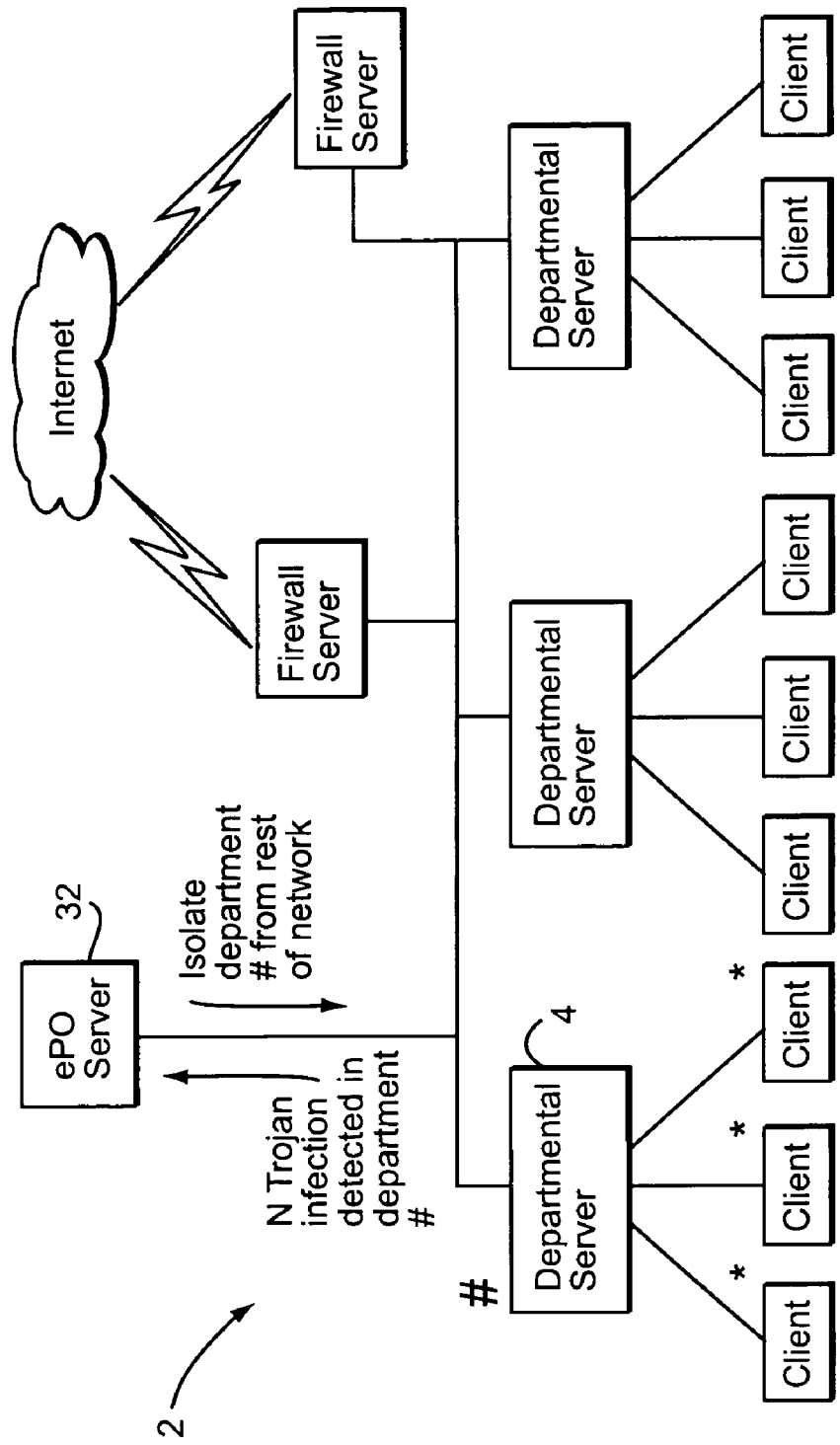

FIG. 6 is a diagram illustrating a further scenario. In this example the malware scanners on a plurality of client computers "*" detect a particular Trojan infection and make reports of this to the policy organising server 32. All of these detections occur within computers connected to a particular departmental server 4. After a threshold number of these detections have been received and the pattern that they are all originating within a given department identified, then the automatic anti-malware action triggered is to isolate the departmental server 4 and accordingly its connected client computers from the rest of the computer network 2. This will protect the rest of the computer network from infection by the Trojan spreading to them from the department that is already infected.

Figure 7:
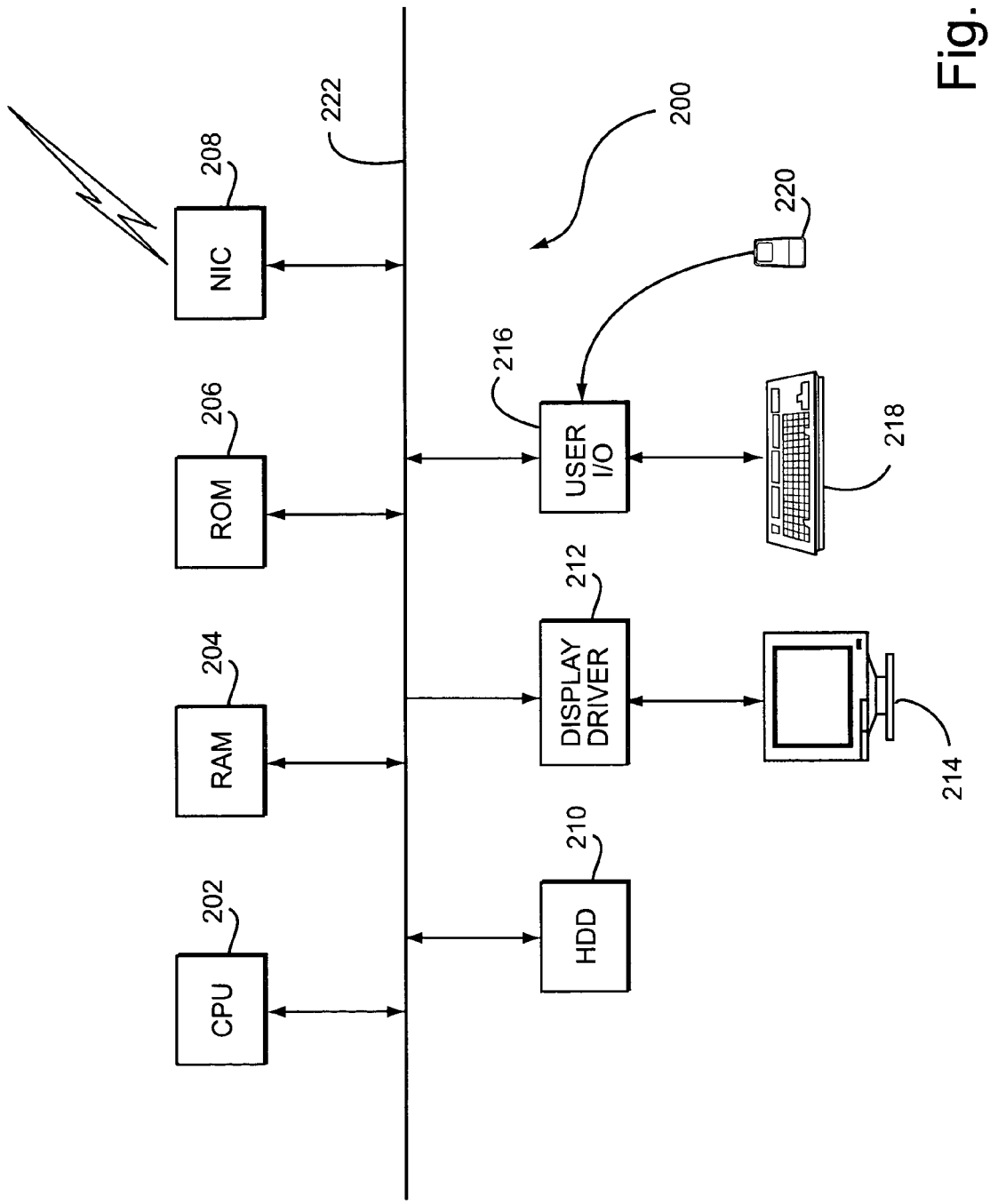
FIG. 7 schematically illustrates the architecture of a general purpose computer that may be used to implement the above described techniques.

FIG. 7 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 7 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A program stored on a computer-readable medium for controlling a managing computer to manage malware protection within a computer network containing a plurality of network connected computers, said computer program product comprising:
   receiving code for receiving at said managing computer a plurality of log data messages identifying detection of malware by respective ones of said plurality of network connected computers;
   detecting code for detecting from said plurality of log data messages received by said managing computer a pattern and a network-wide threshold of malware detection across said plurality of network connected computers matching at least one predetermined trigger, the network-wide threshold being applied to a sum of detections, the detections each being associated with a different one of the network connected computers;
   wherein said plurality of network connected computers each have a malware scanner for scanning computer files to detect malware within said computer files;
   action performing code, responsive to detection of one of said at least one predetermined trigger to perform at least one predetermined anti-malware action;
   wherein predefined network-wide thresholds and patterns are provided as templates; and
   wherein the predefined network-wide thresholds and patterns are customized based on a network being protected.

2. A program stored on a computer-readable medium as claimed in claim 1, wherein said malware scanner includes malware definition data for identifying malware to be detected.

3. A program stored on a computer-readable medium as claimed in claim 2, wherein said at least one predetermined anti-malware action includes forcing an update of malware definition data being used by one or more of said plurality of network connected computers.

4. A program stored on a computer-readable medium as claimed in claim 1, wherein said at least one predetermined anti-malware action includes altering at least one scanner setting of at least one of said malware scanners such that said at least one of said malware scanners performs more thorough malware scanning.

5. A program stored on a computer-readable medium as claimed in claim 1, wheren said at least one predetermined anti-malware action includes isolating at least one of said network connected computers from other parts of said computer network.

6. A program stored on a computer-readable medium as claimed in claim 1, wherein said managing computer stores said plurality of log data messages within a database.

7. A program stored on a computer-readable medium as claimed in claim 6, wherein said detecting code is operable to query said database.

8. A program stored on a computer-readable medium as claimed in claim 6, wherein said database includes data identifying at least one of:
   malware protection mechanisms used by respective network connected computers;

versions of malware protection computer programs used by respective network connected computers;

versions of malware definition data used by respective network connected computers; and security settings of malware protection mechanisms used by respective network connected computers.

9. A program stored on a computer-readable medium as claimed in claim 1, wherein said at least one predetermined anti-malware action is targeted to a particular threat so as to reduce network traffic.

10. A program stored on a computer-readable medium as claimed in claim 1, wherein a plurality of said network connected computers associated with said detections utilize outdated malware definition data.

11. A program stored on a computer-readable medium as claimed in claim 10, wherein said at least one predetermined anti-malware action includes updating only said network connected computers that utilize said outdated malware definition data.

12. A program stored on a computer-readable medium as claimed in claim 1, wherein plurality of said network connected computers associated with said detections are connected to a particular server.

13. A program stored on a computer-readable medium as claimed in claim 12, wherein said at least one predetermined anti-malware action includes isolating only said particular server and said network connected computers connected thereto.

14. A method of managing malware protection within a computer network containing a plurality of network connected computers, said method comprising the steps of:

receiving at a managing computer a plurality of log data messages identifying detection of malware by respective ones of said plurality of network connected computers;

detecting from said plurality of log data messages received by said managing computer a pattern and a network-wide threshold of malware detection across said plurality of network connected computers matching at least one predetermined trigger, the network-wide threshold being applied to a sum of detections, the detections each being associated with a different one of the network connected computers;

wherein said plurality of network connected computers each have a malware scanner that serves to scan computer files to detect malware within said computer files;

in response to detection of said at least one predetermined trigger, performing at least one predetermined anti-malware action;

wherein predefined network-wide thresholds and patterns are provided as templates; and wherein the predefined network-wide thresholds and patterns are customized based on a network being protected.

15. A method as claimed in claim 14, wherein said malware scanner uses malware definition data to identify malware to be detected.

16. A method as claimed in claim 15, wherein said at least one predetermined anti-malware action includes forcing an update of malware definition data being used by at least one of said plurality of network connected computers.

17. A method as claimed in claim 14, wherein said at least one predetermined anti-malware action includes altering at least one scanner setting of at least one malware scanner such that said malware scanner performs more thorough malware scanning.

18. A method as claimed in claim 14, wherein said at least one predetermined anti-malware action includes isolating at least one of said network connected computers from other parts of said computer network.

19. A method as claimed in claim 14, wherein said managing computer stores said plurality of log data messages within a database.

20. A method as claimed in claim 19, wherein said detecting step includes querying said database.

21. A method as claimed in claim 19, wherein said database includes data identifying at least one of:

malware protection mechanisms used by respective network connected computers;

versions of malware protection computer programs used by respective network connected computers;

versions of malware definition data used by respective network connected computers; and security settings of malware protection mechanisms used by respective network connected computers.

22. Apparatus for managing malware protection within a computer network said computer network said computer network containing a plurality of network connected computers, said apparatus comprising:

receiving logic for receiving at a managing computer a plurality of log data messages identifying detection of malware by respective ones of said plurality of network connected computers;

detecting logic for detecting from said plurality of log data messages received by said managing computer a pattern and a network-wide threshold of malware detection across said plurality of network connected computers matching at least one predetermined trigger, the network-wide threshold being applied to a sum of detections, the detections each being associated with a different one of the network connected computers;

wherein each of said plurality of network connected computers have a malware scanner that serves to scan computer files to detect malware within said computer files;

action performing logic, in response to detection of at least one predetermined trigger, for performing at least one predetermined anti-malware action;

wherein predefined network-wide thresholds and patters are provided as templates; and wherein the predefined network-wide thresholds and patterns are customized based on a network being protected.

23. Apparatus as claimed in claim 22, wherein said malware includes malware definition data to identify malware to be detected.

24. Apparatus as claimed in claim 23, wherein said at least one predetermined anti-malware action includes an update of malware definition data in at least one of said plurality of network connected computers.

25. Apparatus as claimed in claim 22, wherein at least one predetermined anti-malware action includes altering at least one scanner setting of at least one malware scanner such that said malware scanner performs more thorough malware scanning.

26. Apparatus as claimed in claim 22, wherein said at least one predetermined anti-malware action includes isolating at least one of said network connected computers from other parts of said computer network.

27. Apparatus as claimed in claim 22, wherein said managing computer stores said plurality of log data messages within a database.

28. Apparatus as claimed in claim 27, wherein said detecting logic is operable to query said database.

29. Apparatus as claimed in claim 27, wherein said database includes data identifying at least one of:

malware protection mechanisms used by respective network connected computers;

versions of malware protection computer programs used by respective network connected computers;

versions of malware definition data used by respective network connected computers; and security settings of malware protection mechanisms used by respective network connected computers.

* * * * *